(Model.)
G. W. DEITZLER.
COOLING APPARATUS FOR AIR OR LIQUIDS.
No. 247,021. Patented Sept. 13, 1881.
2 Sheets—Sheet 1.
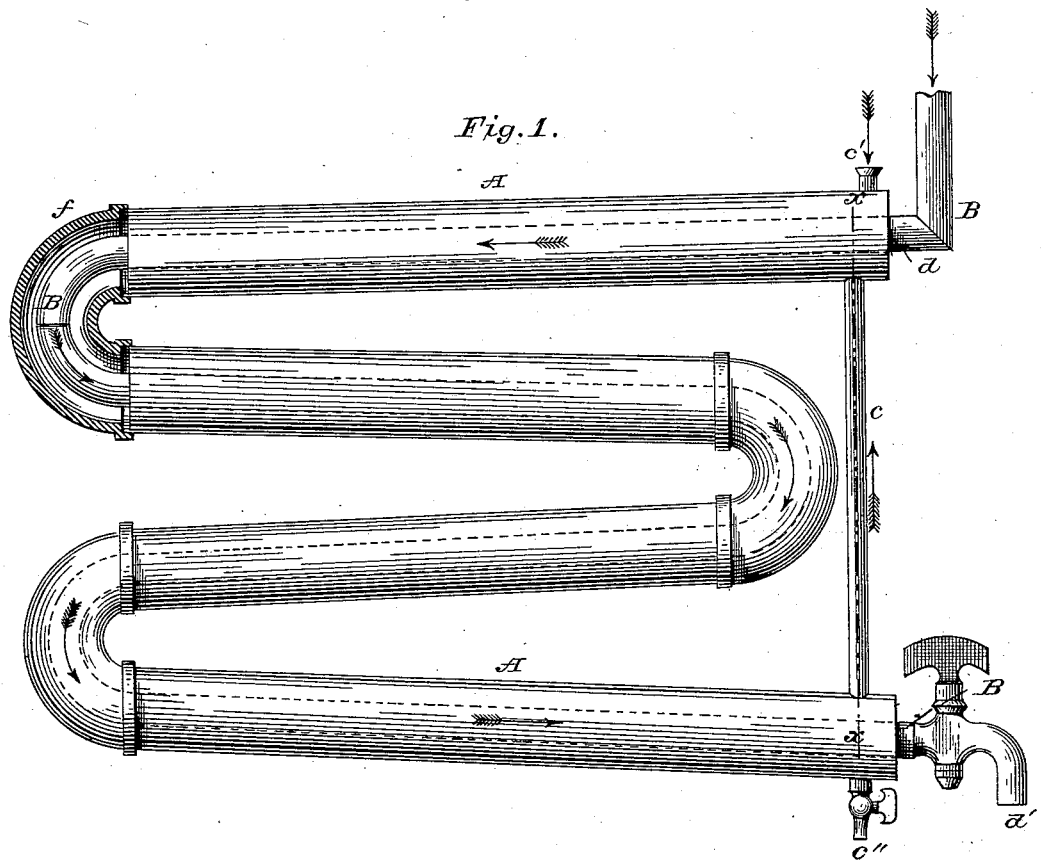
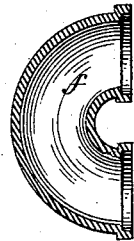
Attest:
N. F. Barnes
Leo Seely
Inventor:
George W. Deitzler
by Ulis Spear
Atty (Model.)
2 Sheets—Sheet 2.
G. W. DEITZLER.
COOLING APPARATUS FOR AIR OR LIQUIDS.
No. 247,021. Patented Sept. 13, 1881.
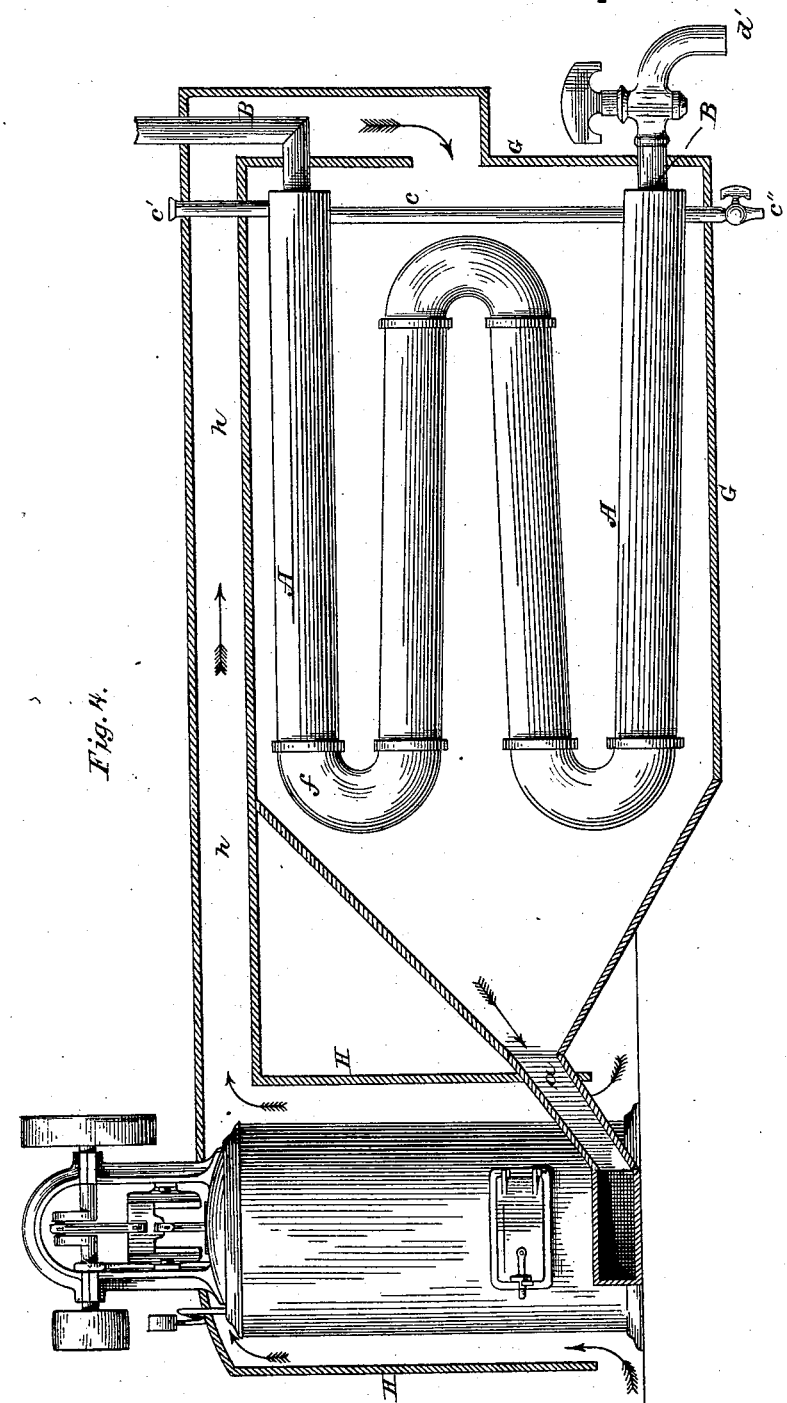

UNITED STATES PATENT OFFICE.

GEORGE W. DEITZLER, OF SAN FRANCISCO, CALIFORNIA.

COOLING APPARATUS FOR AIR OR LIQUIDS.

SPECIFICATION forming part of Letters Patent No. 247,021, dated September 13, 1881.

Application filed April 22, 1881. (Model.)

*To all whom it may concern:*

Be it known that I, GEORGE W. DEITZLER, of the city and county of San Francisco, California, have invented an Improvement in Cooling Apparatus for Air or Liquids, of which the following is a specification.

My invention relates to that class of coolers in which a vessel or vessels formed of terra-cotta or other suitable porous material are adapted to contain water to be cooled, the cooling being effected by the evaporation upon the outer surface of the water percolating from within through the porous walls of the pipes.

The object of said invention is, first, to produce in simple, compact, and inexpensive form an apparatus which shall serve to cool the water contained therein by its own evaporation; second, to provide with such a water-cooling apparatus other devices, to cool by the same means and at the same time either air or beer, wine, or other liquids; and, third, so to inclose the whole evaporating-surface and connect the inclosed space with a furnace-boiler or other heating apparatus that a constant and rapid draft may be economically maintained over said evaporating-surfaces.

The general principle or mode of operation of my present invention so far as it relates to the cooling of water is the same as that described in an application filed by me in the United States Patent Office on the 27th day of December, 1878, and now pending. I have, however, modified the forms of the porous pipes or vessels, have added interior pipes or vessels for containing other liquids or for the passage of air, and have provided a casing and draft apparatus, all as hereinafter fully set forth, and shown in the accompanying drawings.

In these drawings, Figure 1 represents a side elevation of my pipe, partly in section; Fig. 2, a side elevation of one-half of the elbow. Fig. 3 is section on line $x\ x$ of Fig. 1. Fig. 4 represents the apparatus inclosed in a case, said case being in section, and showing, also, the connection with the boiler and fire-grate of a furnace.

The form and arrangement of my improved water-containing vessels are shown in Figs. 1 and 4. In these figures A represents a pipe, which may be made of unglazed earthenware or any equivalent porous material such as will permit a slow percolation through the sides of the vessel sufficient to supply the water for evaporation.

In order to secure the largest amount of evaporating and heat-conducting surface and the longest line of movement for the liquids contained in the pipe or pipes, together with the greatest possible compactness in form, I arrange the tubes in the form shown in the figures referred to above, sections A A of the porous pipe being connected at the ends by means of elbows $f\ f$. In accordance with this arrangement the pipes are carried back and forth, leaving a space between the sections of the coil-pipes sufficient for the circulation of the air, by means of which the water upon the surface is to be evaporated. The extremities of the pipes A A not connected by the elbows $f\ f$ are closed to prevent the escape of the water, and are connected by a pipe, $c$, by means of which the circulation of the water is maintained throughout the whole series of coils. A short pipe, $c'$, is provided at the end of the upper coil or section, by means of which water may be introduced into the pipes from any convenient reservoir. The supply of water through this pipe should be properly filtered, and should be automatically regulated, so as to keep it constant and uniform, to compensate for the loss by evaporation. This part of the apparatus is the same as that described in my former application, heretofore referred to. A cock, $c''$, is also provided upon the lower section of the porous tube, by which the water may be drawn off at any time.

Within the porous pipe A, I have provided a smaller pipe, B, extending throughout its whole length, and arranged so as to leave an annular space between the exterior surface of the inner pipe and the interior surface of the outer pipe. This tube B may be made of copper or any other suitable material, preferably of good heat-conducting power. The bent portions of the pipe B are inclosed at the ends by means of the sections of the elbows $f$, which connect the outer tubes, A. These sections are made as shown in Fig. 2, and may be closed over the bent portion of the pipe B, being connected to each other and to the pipes A A by water-tight joints. The pipe B is made to extend at the upper end through the closed end of the pipe A, as shown clearly at $d$ in Fig. 1, and the same figure shows also a cock, $d'$, at the lower end of the said tube, by means of which beer or other liquids may be drawn from the inclosed pipe.

The form of the apparatus heretofore described may be made to operate with good effect when exposed to the ordinary natural currents of air; but when it is desirable to produce the greatest reduction of temperature by my apparatus I inclose it in a casing or jacket with openings for the passage of air and with means for producing a draft over the porous vessels or tubes.

A very simple, economical, and effective device for this purpose, automatic in its operation, is shown in Fig. 4. It consists of a casing or jacket, G, inclosing the coil of pipes in such a manner as to leave a free space around the exterior of said coil of pipes and within the casing. This casing is connected with the ash-box or fire-grate of a furnace by means of a pipe, $a$, as shown in section in Fig. 4, the arrangement being such that the draft of the furnace will create a draft through the casing above described and over the surface of the porous vessels.

In order that the air before it enters the opposite end of the casing may be dry and expanded, it is caused to pass within a jacket, H, inclosing the steam-boiler, as shown in Fig. 4 of the drawings. After passing through the space within the jacket H it is connected by means of a pipe, $h$, to the end of the casing G, where it is admitted into said casing and passed over the surface of the pipes aforesaid. By thus drying the air and increasing the rapidity of its passage over the porous vessels the evaporation will be greatly augmented, and in the same degree the intensity of the cold increased.

The operation of my device may be easily understood. After it has been placed in proper position the cocks $c'$ $d'$ are closed and tube A is filled with water at $c$, and the tube B is filled with beer or wine or other liquid which it may be desired to cool. A small portion of the water in the tube A percolating through the porous walls evaporates on the outer surfaces, thus cooling the remainder of the water in said tube; also, the beer or other liquid in the tube B will be cooled by replacing with their sensible heat that made latent by evaporation.

The beer or other liquid may be led through a pipe directly from the barrel or other reservoir, and, as before stated, the supply of water through the pipes A must be constantly kept up by suitable automatic apparatus, which it is not necessary here to describe.

Instead of drawing off the cold water at $c'$, it may be led through the pipe to the apparatus for cooling wort during fermentation or to the cold-water space described in my former application, heretofore referred to.

When the apparatus is to be used for cooling air the interior tube, B, may be left empty and open at both ends, and the air forced through said tube by any suitable means.

It will be understood that instead of one pipe, B, several pipes for different kinds of liquid to be cooled may be used within the porous pipes A A.

In the foregoing description I have set forth the best form of construction and arrangement of parts to effect the results which I have aimed to accomplish; but I would have it understood that I do not limit myself to the exact form shown and described, since it is evident that many changes may be made which would not depart from the spirit of my invention.

I am aware that a refrigerating-chamber has been inclosed in a box provided with tubes or plates, to the surface of which a refrigerant has been applied from an external reservoir, and the tubes or plates exposed to a current of air for cooling purposes; and also that beer has been cooled by passing it while hot through metal pipes surrounded by cold water, the beer and water traveling in opposite directions, and I do not claim the same; but,

Having thus described my invention, what I claim, and desire to secure by Letters Patent, is—

1. In combination with the porous vessels A, the vessel or tube B, arranged within A, with a space between the inner and outer vessels, both said vessels or tubes being combined with inlet and outlet openings, as and for the purpose set forth.

2. In combination with the porous receptacle A and the inner non-porous receptacle, B, the casing G, provided at one end with an opening for the admission of air and at the other with an exit-pipe, said inner and outer receptacles having pipe-connections through said casing, as and for the purpose set forth.

3. The combination, with the described inner and outer receptacles, B A, of the jacket G, having flue $a$, the jacket H, inclosing the steam-boiler, and the flue $h$, substantially as and for the purposes set forth.

4. In an apparatus for cooling liquids, porous pipes or vessels inclosed within a casing, said casing being connected to an ash-box or fire-grate to produce a draft, as and for the purpose set forth.

5. In a cooling apparatus, an outer porous pipe or vessel having pipe-connections to admit or withdraw water, in combination with a non-porous pipe or vessel located within said porous pipe or vessel, said non-porous pipe being of smaller exterior diameter than the interior diameter of the porous pipe, and having also pipes to admit or withdraw fluid, as set forth.

In testimony whereof I have signed my name to this specification in the presence of two subscribing witnesses.

GEORGE W. DEITZLER.

Witnesses:
ALMARIN B. PAUL,
S. A. RAYMOND.